United States Patent Office 3,661,848
Patented May 9, 1972

3,661,848
FORMATION OF POLYPHENYLENE ETHERS
Glenn D. Cooper, Delmar, and James G. Bennett, Menands, N.Y., assignors to General Electric Company
No Drawing. Continuation of abandoned application Ser. No. 807,076, Mar. 13, 1969. This application Nov. 6, 1970, Ser. No. 87,645
Int. Cl. C08g 23/18
U.S. Cl. 260—47 ET               15 Claims

ABSTRACT OF THE DISCLOSURE

A process for the formation of high molecular weight polyphenylene ethers by the oxidative coupling of a phenolic percursor in a reaction system containing a low molecular weight alcohol and a complex catalyst formed from a non-basic cupric salt and a primary or secondary amine. The process is characterized by the addition of the alcohol to the reaction system which (1) results in the formation of higher molecular weight polymer in a given reaction time or polymer of comparable molecular weight in substantially decreased reaction time and (2) permits the use of aqueous solutions of cupric salts and cupric salts in hydrated form.

---

This is a continuation of application Ser. No. 807,076, filed Mar. 13, 1969, and now abandoned.

BACKGROUND OF THE INVENTION (1) Field of the invention

This invention relates to the formation of synthetic polymers from phenolic precursors, and more particularly, to the formation of polyphenylene ethers by the self-condensation of phenols in a reaction system containing an alcohol and a complex catalyst formed from a non-basic cupric salt and a primary or secondary amine.

(2) Description of the prior art

The polyphenylene ethers and processes for their formation are known in the art and described in numerous publications including U.S. Pats. Nos. 3,306,874 and 3,306,875 of Allan S. Hay, U.S. Pat. No. 3,384,619 of Takeshi Hori et al. and U.S. patent application Ser. No. 807,126 filed on even date herewith, all incorporated herein by reference.

The process of the aforesaid Hay Pat. No. 3,306,875 involves the self-condensation of a monovalent phenolic precursor using a catalyst comprising a tertiary amine-basic cupric salt complex. The phenols which may be polymerized by the process correspond to the following structural formula:

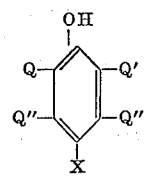

where X is a substituent selected from the group consisting of hydrogen, chlorine, bromine and iodine; Q is a monovalent substituent selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' and Q" are the same as Q and in addition, halogen with the proviso that Q, Q' and Q" are all free of a tertiary alpha-carbon atom. Polymers formed from the above-noted phenols will correspond to the following structural formula:

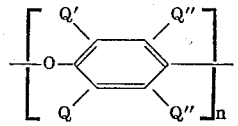

where the oxygen ether atom of one repeating unit is connected to the phenylene nucleous of the next repeating unit; Q, Q' and Q" are as above defined; and $n$ is a whole integer equal to at least 100.

According to the process of Hay, the formation of the polyphenylene ethers involves the self-condensation of a phenol in the presence of a catalyst system comprising a tertiary amine-basic cupric salt complex. It is disclosed that the copper salt used to form the complex catalyst is not critical and may be either a basic-cupric salt or a cuprous salt provided that if a cuprous salt is used, it must be capable of existing in the cupric state. When a cuprous salt is used, the catalyst is said to form by oxygen and water reacting with an intermediate tertiary amine-cuprous salt complex thereby forming a tertiary amine-basic cupric salt complex. Various methods are reported for forming the complex catalyst starting with a cupric salt. For example, it is reported that a reducing agent may be used with a cupric salt to form the cuprous salt in situ, which in turn forms the tertiary amine-basic cupric salt complex when admixed with the amine. Alternatively, it is reported that the complex can be formed between a tertiary amine and a basic cupric salt formed by reacting cupric salts with an alkaline salt of a phenol, by treating a cupric salt with an ion exchange resin having exchangeable hydroxyl groups by adding a base to a cupric salt or by adding cupric hydroxide to a cupric salt. U.S. Pat. No. 3,306,874 of Hay is similar except that primary and secondary amines are used in place of the tertiary amines.

The above-noted U.S. Pat. No. 3,384,619 of Hori et al. is also for a process for the self-condensation of phenols to high molecular weight polyphenylene ethers but differs from the Hay patents in that a catalyst is used comprising a tertiary amine and a non-basic cupric salt. It is claimed that the reaction must be performed in a solvent system containing at least 5 weight percent alcohol in order to obtain high molecular weight polymer. Moreover, in the Hori et al. process, the catalyst concentration in the reaction mixture is excessively high, typically 9 parts amine to 1 part phenol, thereby making the overall process expensive and commercially undesirable. Finally, it is reported in the Hori et al. patent that attempts to form a polyphenylene ether in toluene at these high catalyst concentrations in the absence of alcohol were unsuccessful and no polymer formed.

Commonly-owned copending U.S. patent application (807,126) above-noted is directed to an improved process for the self-condensation of high molecular weight polyphenylene ethers using a complex catalyst formed from a primary or secondary amine and an anhydrous, non-basic cupric salt. The process of this application is characterized by the use of the anhydrous non-basic cupric salts and is an improvement over the Hori et al. patent in that the concentration of catalyst components is small relative to the concentration of monomer and consequently, the overall cost of the process is substantially reduced. Moreover, the process of the application is an improvement over other processes in the prior art in that the molecular weight of the polyphenylene ether formed is higher than otherwise available in a given reaction time, or alternatively, the reaction time is shorter for recovery of polymer of comparable molecular weight.

STATEMENT OF THE INVENTION

The present invention is an improvement over that of commonly-owned copending U.S. patent application Ser. No. 807,126 and is predicated upon the discovery that the addition of a small amount of an alcohol, typically less than 3% by weight of the reactants, permits the use of both hydrated non-basic cupric salts and aqueous solutions of non-basic cupric salts in the preparation of the complex catalyst used for the formation of the polyphenylene ethers. Moreover, the addition of the alcohol to the reaction system also permits formation of polymer of higher molecular weight or correspondingly, equal molecular weight in a shorter reaction time using anhydrous cupric salts, hydrated cupric salts and aqueous solutions thereof. The ability to use hydrated cupric salts or their aqueous solutions is important as these materials are more readily available than the anhydrous cupric salts and are lower in cost. The process for forming polyphenylene ethers in accordance with the invention comprises passing an oxygen-containing gas through a solution containing the phenolic monomer and the complex catalyst formed in the presence of an alcohol from the primary or secondary amine and the non-basic cupric salt.

DESCRIPTION OF THE PREFERRED EMBODIMENTS

The process of the subject invention is broadly applicable to those phenols disclosed in the above-noted Hay patents, but is preferably used with phenols corresponding to the following structural formula:

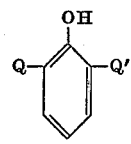

where Q and Q' are as above defined. The most preferred phenols for purposes of the present invention are those where Q and Q' are hydrocarbon radicals having from 1 to 8 carbon atoms. Examples of most preferred phenols include 2,6-dimethylphenol, 2,6-diethylphenol, 2-methyl-6-ethylphenol, 2-methyl-6-allylphenol, 2-methyl-6-phenylphenol, 2,6-dibutylphenol and 2-methyl-6-propylphenol.

The primary or secondary amine component of the catalyst complex corresponds to those disclosed in the above-noted U.S. Pat. No. 3,306,874, representative examples including aliphatic amines including cycloaliphatic amines where the cycloaliphatic group is substituted on the amine nitrogen, for example, mono- and di-propyl amine, mono- and dibutyl amine, mono- and disecondary propyl amine, mono- and dicyclohexylamine, ethylmethyl amine, morpholine, methylcyclohexylamine, N,N'-dialkylethylenediamines, the N,N'-dialkylpropanediamines, the N,N,N'-trialkylpentanediamines, etc.

Obviously, mixtures of primary and secondary amines may be used if desired. Lower, straight chained dialkylmonoamines such as dibutyl amine and diethylamine are preferred. The concentration of amines in the reaction mixture may vary within wide limits, but is desirably added in low concentrations. A preferred range comprises from about 2.0 to 25.0 moles per 100 moles of monomer.

Typical examples of cupric salts suitable for the process include cupric chloride, cupric bromide, cupric sulphate, cupric azide, cupric tetramine sulfate, cupric acetate, cupric butyrate, cupric toluate, etc. Preferred cupric salts are the cupric halides, cupric bromide being most preferred. The concentration of the cupric salt is desirably maintained low and preferably varies from about 0.2 to 2.5 moles per 100 moles of phenolic monomer.

In copending U.S. patent application Ser. No. 807,126, it is reported that the non-basic cupric salt used to form the complex catalyst must be in its anhydrous form rather than in a hydrated form. In said application, this is a requirement because a slight quantity of water present in the system prior to formation of the complex of the amine and the non-basic salt is highly detrimental to the polymerization reaction and results in the formation of a catalyst complex of substantially reduced catalytic activity. For example it has been observed that with a complex catalyst formed from cupric chloride dihydrate and an amine, polymer is formed having an intrinsic viscosity less than approximately 50% of that of a polymer formed using a catalyst formed from an amine and an anhydrous cupric chloride.

In accordance with the present invention, when an alcohol is added to the reaction mixture, the cupric salt may be in a hydrated form or in aqueous solution. The reason for this is not understood, but the results are important inasmuch as hydrated cupric salts and aqueous solutions thereof are more readily available and substantially lower in cost. Moreover, as an additional advantage to the invention, the addition of the alcohol results in the formation of higher molecular weight polymer within a given reaction time, or alternatively, polymer of corresponding molecular weight in a shorter reaction time.

The alcohol used in the reaction system is not critical though lower aliphatic alcohols are preferred, exemplary of which are methanol, ethanol, propanol, butanol, allyl alcohol and the like. Methanol is most preferred because this alcohol often is used as an antisolvent in precipitating and recovering the polymer from reaction solution. Consequently, the use of methanol in the reaction system does not add an additional organic compound to the reaction system. The amount of alcohol is preferably maintained low, the alcohol constituting as little as 0.2% by volume of the total reaction system, and preferably maintained in a range of from 0.5 to 3.0% by volume of the reaction system.

The polymerization reaction is performed in a solvent of a general class disclosed in the Hay patents abovenoted, aromatic solvents such as benzene and toluene providing best results. In addition, the reaction mixture may contain a promoter such as a diaryl guanidine as disclosed in commonly owned copending U.S. patent application Ser. No. 807,126 or diaryl formamidine as disclosed in commonly owned copending U.S. patent application Ser. No. 807,047, now Pat. No. 3,544,516. In other aspects, the process for forming polymer and the conditions therefor such as temperature, oxygen flow rate and the like are essentially the same as the conditions disclosed in the above-noted Hay patents, though reaction time to generate high molecular weight polymer is reduced. The above noted concentration ranges are preferred, though these ranges may vary to some extent dependent upon oxygen flow rate, reaction temperature and the like. For purposes of economy, lower concentrations of cupric salt and amine are preferred. It is characteristic of the invention disclosed herein that a reaction system using an alcohol and a complex catalyst formed from a primary or secondary amine and a non-basic cupric salt permits formation of high molecular weight polymer with lower concentrations of cupric salts and amine than would otherwise be permissible.

The invention will be more fully illustrated by the following examples where Examples 1 to 4 compare procedures for the formation of a polyphenylene ether using (1) a complex catalyst of an anhydrous non-basic cupric halide and amine, (2) an anhydrous cupric halide and an amine in the presence of an alcohol, (3) an aqueous solution of a cupric halide and an amine and (4) an aqueous solution of a cupric halide and an amine in the mine in the presence of an alcohol.

Example 1

A complex catalyst was prepared in 100 ml. of toluene by stirring together 0.42 gram of anhydrous cupric bromide, 10.9 grams of di-n-butylamine, and 4 ml. of a 55% by weight solution of 2,6-xylenol dissolved in toluene. The catalyst complex so prepared was transferred to a one-liter flask equipped with cooling coils, thermometer well, and inlet tubes for oxygen and monomer. Following preparation of the catalyst, 400 ml. of toluene was added and the mixture was stirred at 1500 r.p.m. by a single 2" x ¼" turbine stirrer while oxygen was introduced into the reaction mixture at a rate of 1.0 cubic feet per hour. Thereafter, 127 grams of a 55% solution of 2,6-xylenol dissolved in toluene were added over a period of eight minutes. Temperature was maintained throughout the reaction period at 30° C. by circulating water from a constant temperature bath through coils in the reaction mixture. After 1 hour and 45 minutes, the temperature was increased to 35° C. and 15 minutes thereafter 30 ml. of a 50% by weight aqueous acetic acid solution was added to kill the reaction. The mixture was centrifuged and the polymer precipitated from the upper toluene phase by addition of methanol. The polymer was filtered off, washed with methanol, and dried at 70° C. under vacuum. Poly(2,6-dimethyl-1,4-phenylene) ether was recovered in a yield of 90% of theoretical and the polymer had an intrinsic viscosity of 0.61 deciliters per gram (dl./g.) as measured in chloroform at 30° C.

Example 2

The procedure of Example 1 was repeated, but 6 ml. of methanol was added to the components of the catalyst. The amount of methanol added was equivalent to 1% by volume of the total reactants in the reaction mixture following addition of 2,6-xylenol in toluene. The polymer was recovered in a yield of 97% of theoretical and possessed an intrinsic viscosity of 0.65 dl./g.

Example 3

The procedure of Example 1 was repeated except that 0.84 g. of a 50% by weight aqueous cupric bromide solution was substituted for the anhydrous cupric bromide of Example 1. The polymer recovered was in an amount of 58% of theoretical and possessed an intrinsic viscosity of 0.09 dl./g.

Example 4

The procedure of Example 3 was repeated, but 6 ml. of methanol was added to the components of the catalyst system. The polymer recovered was in a yield of 96% of theoretical and possessed an intrinsic viscosity of 0.55 dl./g.

The results of the above examples are set forth in the following table:

| Ex. No. | Copper salt | Additive | Yield (percent) | I.V. (dl./g.) |
|---|---|---|---|---|
| 1 | CuBr₂ (anh) |  | 90 | 0.61 |
| 2 | CuBr₂ (anh) | MeOH | 97 | 0.65 |
| 3 | CuBr₂ (aq) |  | 58 | 0.09 |
| 4 | CuBr₂ (aq) | MeOH | 96 | 0.55 |

A comparison of the Examples 1 and 2 shows that using anhydrous cupric bromide, the addition of methanol improves both yield and intrinsic viscosity. In Example 3, where an aqueous solution of cupric bromide was used for the formation of the catalyst, yield was low and the intrinsic viscosity was unacceptable. Addition of methanol as in Example 4 resulted in a substantially increased yield and an intrinsic viscosity well within an acceptable range.

Example 5

A complex catalyst was prepared in 100 ml. of toluene by stirring together 0.76 gram of anhydrous cupric chloride, 10.9 grams of di-n-butyl amine and 4 ml. of 55% by weight solution of 2,6-xylenol dissolved in toluene. The catalyst complex so prepared was transferred to a one liter flask equipped with cooling coils, thermometer well and inlet tubes for oxygen and monomer. Following preparation of the catalyst, 400 ml. of toluene was added and the mixture was stirred at 1500 r.p.m. by a single 2" x ¼" turbine stirrer while oxygen was introduced into the reaction mixture at a rate of 1.0 cubic feet per hour. Thereafter, 123 grams of a 55% solution of 2,6-xylenol dissolved in toluene were added over a period of 8 minutes. Temperature was maintained throughout the reaction period at 30° C. by circulating water from a constant temperature bath through the coils in the reaction mixture. After one hour and 45 minutes, the temperature was increased to 35° C. and 15 minutes thereafter. 30 ml. of a 55% by weight aqueous acetic acid solution was added to kill the reaction. The mixture was centrifuged and polymer precipitated from the upper toluene phase by the addition of methanol. The polymer was filtered off, washed with methanol and dried at 70° C. under vacuum yielding 65.0 grams of poly-(2,6-dimethyl-1,4-phenylene) ether (95% of theoretical) having an intrinsic viscosity of 0.46 dl./g.

Example 6

The procedure of Example 5 was repeated, but 6 ml. of methanol (approximately 1% by volume of total reactants including monomer and solvent in the reaction mixture) was added to the components of the catalyst. The polymer was recovered in a yield of 92% of theoretical and possessed an intrinsic viscosity of 0.61 dl./g. Comparison of this example with Example 5 shows a substantial increase in intrinsic viscosity due to the addition of methanol.

Example 7

The procedure of Example 6 was repeated, but the methanol was increased to 12 ml., an amount twice that used in Example 6. The polymer recovered was in a yield of 93% of theoretical and possessed an intrinsic viscosity of 0.63 dl./g.

Example 8

The procedure of Example 6 was repeated, but 12.1 gm. of tripropylamine was substituted for di-n-butyl amine. At the end of two hours reaction time, no polymer was recovered from the reaction mixture.

Example 9

The procedure of Example 6 was repeated, but isopropyl alcohol was substituted for methanol. Polymer was recovered in a yield of 97% of theoretical and possessed an intrinsic viscosity of 0.53 dl./g.

Example 10

The procedure of Example 6 was repeated, but the concentration of cupric chloride was reduced by 50%. The polymer was recovered in a yield of 95% of theoretical and possessed an intrinsic viscosity of 0.46 dl./g.

Example 11

To a tube type reaction vessel equipped with a Vibro-Mixer stirrer, thermometer, and an oxygen inlet tube, there were added 120 ml. of toluene, 0.73 gram of n-butyl amine and 0.223 gram (0.01 mole) of anhydrous cupric bromide. The mixture was stirred and 10.0 grams of 2,6-xylenol dissolved in 20 milliters of toluene were added. Oxygen was passed through the stirred reaction mixture for a period of approximately 120 minutes while maintaining reaction temperature at 25° C. The polymerization reaction was terminated with acetic acid, the acid layer removed, and the polymer precipitated with methanol. The polymer, reslurried with methanol and vacuum dried, weighed 9.1 grams (93.0% of theoretical) and had an intrinsic viscosity of 0.44 dl./g.

Example 12

The procedure of Example 11 was repeated with the addition of 1% by volume methanol (based upon the total volume of the reaction system) with the resulting polymer recovered in an amount of 91% of theoretical and having an intrinsic viscosity of 0.50 dl./g.

Example 13

The procedure of Example 12 was repeated with the substitution of 3% isopropyl alcohol for methanol. The yield of polymer was 92.8% of theoretical and the polymer possessed an intrinsic viscosity of 0.60 dl./g.

It should be understood that changes may be made in the embodiments above described without departing from the invention as defined by the following claims.

We claim:

1. A process for the formation of a high molecular weight polyphenylene ether of the formula

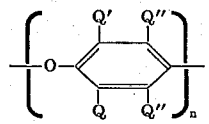

wherein the oxygen ether atom of one repeating unit is connected to the phenylene nucleus of the next repeating unit; Q, Q' and Q'' are as hereinafter defined; and $n$ is a whole integer equal to at least 100 from a monovalent phenol of the formula

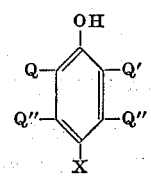

where
X is hydrogen, chlorine, bromine or iodine;
Q is hydrogen, a hydrocarbon radical, a halohydrocarbon radical having at least two carbon atoms between the halogen atom and the phenol nucleus, a hydrocarbonoxy radical, or a halohydrocarbonoxy radical having at least two carbon atoms between the halogen atom and the phenol nucleus; and
Q' and Q'' are the same as Q and in addition, halogen, provided that Q, Q' and Q'' are all free of a tertiary alpha carbon atom which comprises
(a) forming a complex catalyst from a non-basic cupric salt, an amine selected from the group consisting of primary and secondary amines, and an alcohol; and
(b) oxidatively coupling said monovalent phenol in a solvent in the presence of said complex catalyst; the amount of alcohol in step (a) not exceeding 5% by volume of the reaction mixture including said monovalent phenol, said complex catalyst and said solvent.

2. The process of claim 1 where the monovalent phenol corresponds to the formula:

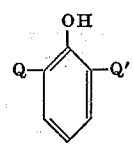

where Q is a monovalent substituent selected from the the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and phenol nucleus and Q' is the same as Q and in addition halogen with the proviso that Q and Q' are free of a tertiary alpha-carbon atom.

3. The process of claim 2 where Q and Q' are each alkyl having from 1 to 4 carbon atoms.

4. The process of claim 3 where the cupric salt is selected from the group consisting of anhydrous cupric salts, hydrated cupric salts and aqueous solutions of cupric salts.

5. The process of claim 1 where the alcohol is present within the range of from 0.5 to 3.0% by volume of the total reaction mixture.

6. The process of claim 1 where the alcohol is a low molecular weight alcohol.

7. The process of claim 6 where the alcohol is methanol.

8. The process of claim 1 where the monovalent phenol is 2,6-dimethylphenol.

9. The process for the formation of a high molecular weight polyphenylene ether corresponding to the formula:

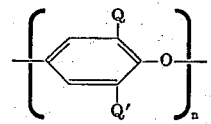

where Q and Q' are monovalent substituents selected from the group consisting of lower aliphatic radicals having from 1 to 4 carbon atoms and phenyl, and $n$ is a whole integer equal to at least 100, said process comprising
(a) forming a polymerization complex catalyst from a non-basic cupric halide, an amine selected from the group consisitng of primary and secondary amines and an alcohol; and
(b) oxidatively coupling a phenolic precursor in a solvent in the presence of said catalyst, the alcohol in step (a) being present in an amount not exceeding 5% by volume of the reaction mixture including phenol, the complex catalyst and solvent.

10. In a process for the formation of a high molecular weight polyphenylene ether corresponding to the formula:

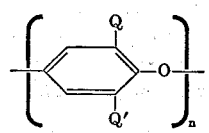

where Q and Q' are monovalent substituents selected from the group consisting of lower aliphatic radicals having from 1 to 4 carbon atoms and phenyl, and $n$ is a whole integer equal to at least 100, comprising the oxidative coupling of a phenolic precursor in the presence of a polymerization complex catalyst formed from a non-basic cupric halide and an amine selected from the group consisting of primary and secondary amines; the improvement wherein the catalyst is formed in the presence of an alcohol in an amount not exceeding 5% by volume of the reaction mixture including phenol, the complex catalyst and solvent.

11. The process of claim 10 where the cupric halide is selected from the group consisting of anhydrous cupric halides, hydrated cupric halides and aqueous solutions of cupric halides.

12. The process of claim 10 where the alcohol is present within the range of from 0.5 to 3.0% by volume of the total reaction mixture.

13. The process of claim 10 where the alcohol is a low molecular weight alkyl alcohol.

14. The process of claim 13 where the alcohol is methanol.

15. The process of claim 10 where the monovalent phenol is 2,6-dimethylphenol.

References Cited

UNITED STATES PATENTS

| | | | |
|---|---|---|---|
| 3,306,874 | 2/1967 | Hay | 260—47 |
| 3,306,875 | 2/1967 | Hay | 260—47 |
| 3,384,619 | 5/1968 | Hori et al. | 260—47 |

MELVIN GOLDSTEIN, Primary Examiner